United States Patent
Yablon

(10) Patent No.: US 7,340,138 B1
(45) Date of Patent: Mar. 4, 2008

(54) OPTICAL FIBER DEVICES AND METHODS FOR INTERCONNECTING DISSIMILAR FIBERS

(75) Inventor: Andrew D. Yablon, Livingston, NJ (US)

(73) Assignee: Furukawa Electric North America, Inc., Norcross, GA (US)

( * ) Notice: Subject to any disclaimer, the term of this patent is extended or adjusted under 35 U.S.C. 154(b) by 0 days.

(21) Appl. No.: 11/627,070

(22) Filed: Jan. 25, 2007

(51) Int. Cl.
*G02B 6/02* (2006.01)

(52) U.S. Cl. .......................... 385/124; 385/15; 385/31; 385/123

(58) Field of Classification Search ................. 385/15, 385/31, 123, 124
See application file for complete search history.

(56) References Cited

U.S. PATENT DOCUMENTS

| | | | |
|---|---|---|---|
| 4,701,011 A * | 10/1987 | Emkey et al. | 385/34 |
| 2004/0252946 A1 * | 12/2004 | DiGiovanni et al. | 385/43 |

* cited by examiner

*Primary Examiner*—Jennifer Doan
(74) *Attorney, Agent, or Firm*—Jacobs & Kim LLP; Daniel Kim, Esq.

(57) ABSTRACT

A coupling waveguide is interconnected between a launching fiber and a receiving fiber to reduce coupling loss. The coupling waveguide includes an integrally formed graded index lens having a non-parabolic refractive index profile. The graded index lens receives as an input a coupling mode field of an optical signal launched by the launching fiber and transforms the coupling mode field into a transverse spatial distribution matching a corresponding coupling mode field of the receiving fiber.

20 Claims, 9 Drawing Sheets

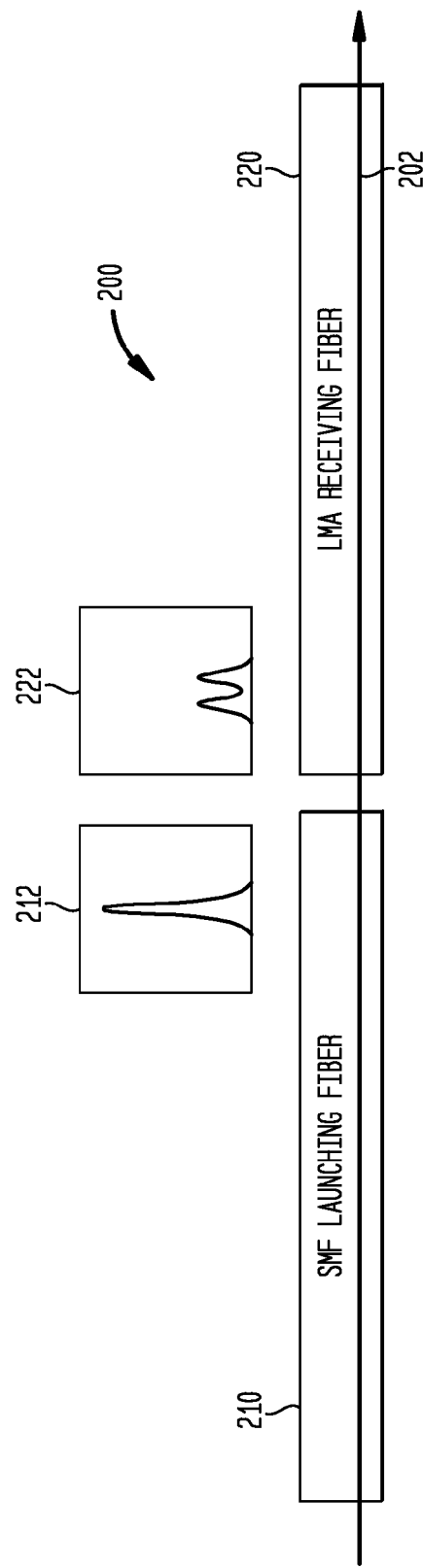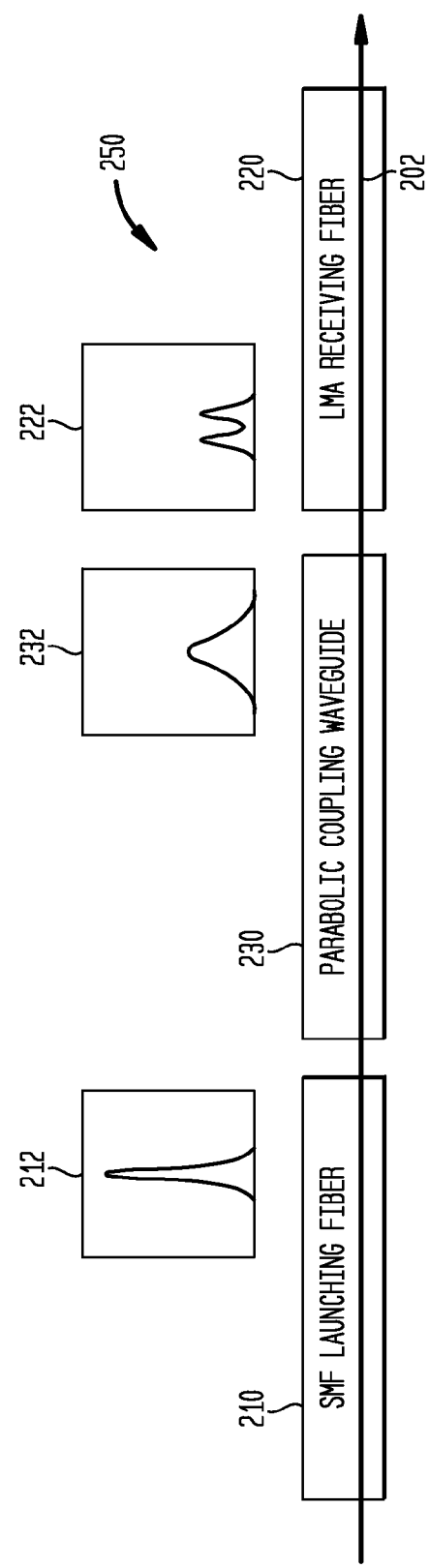

OPTICAL FIBER DEVICES AND METHODS FOR INTERCONNECTING DISSIMILAR FIBERS

BACKGROUND OF THE INVENTION

1. Field of the Invention

The present invention relates generally to optical fiber devices and methods and in particular to optical fiber devices and methods for interconnecting dissimilar fibers.

2. Description of Prior Art

High-power fiber lasers, amplifiers, and other devices are typically assembled from many individual fibers and components that must be interconnected with low optical loss. Recently developed high-power optical fibers have non-traditional mode field areas, e.g., greater than 100 micrometers squared, and arbitrary fundamental $LP_{01}$ mode field shapes, such as a ring shape, a plateau in the center of the mode field, or the like. Furthermore, certain optical fibers are designed to carry the signal in a higher-order transverse mode, such as the $LP_{02}$ mode, that is also non-traditionally shaped. Such non-standard mode fields cannot be efficiently interconnected using existing technology.

SUMMARY OF THE INVENTION

The above-described issues, and others, are addressed by the present invention, an aspect of which is directed to systems and techniques for providing low-loss coupling between a launching fiber and a receiving fiber having different transverse mode field distributions, at least one of which is non-Gaussian. The system includes a specially designed coupling waveguide that is interconnected between the launching fiber and the receiving fiber. The coupling waveguide includes an integrally formed graded index lens having a non-parabolic refractive index profile. The graded index lens receives as an input a coupling mode field of an optical signal launched by the launching fiber and transforms the coupling mode field into a transverse spatial distribution matching a corresponding coupling mode field of the receiving fiber.

According to a further aspect of the invention, the described coupling waveguide may be connected to the terminus of a receiving fiber to transform the mode field distribution of an input received in the form of impinging radiation. Alternatively, the coupling waveguide may be connected to the terminus of a launching fiber to transform the mode field distribution of the launching fiber output before providing that output in the form of emitted radiation.

Additional features and advantages of the present invention will become apparent by reference to the following detailed description and accompanying drawings.

BRIEF DESCRIPTION OF THE DRAWINGS

FIG. 3 shows an exploded diagram of an optical transmission line fabricated from the exemplary SMF and LMA fibers.

FIG. 4 shows an exploded diagram of an optical transmission line in which a coupling waveguide with a parabolic refractive index profile is interconnected between the exemplary SMF and LMA fibers.

DETAILED DESCRIPTION

An aspect of the invention provides a technique for reducing coupling loss between a launching fiber and a receiving fiber with dissimilar mode fields, at least one of which is non-Gaussian. A technique is described for designing and manufacturing a specially tailored multimode fiber with a non-parabolic index profile that, when interconnected between the launching and receiving fiber, smoothly transforms the size and shape of the launching fiber output mode field to substantially match the mode field distribution of the receiving fiber. The described technique and coupling waveguide achieve a significantly improved reduction in coupling loss, compared with prior art techniques for reducing coupling loss, including prior art techniques, for example, in which a short length of parabolic index profile multimode fiber is used for fiber interconnection. As described herein, numerical fiber design tools can be used to design such special non-parabolic multimode intermediate fibers based on the characteristics of the fibers to be interconnected. Modified chemical vapor deposition (MCVD) or other suitable fiber fabrication technology can be used to produce the described fiber devices.

The design and function of the present invention is now described with respect to the reduction of coupling loss with respect to the fundamental $LP_{01}$ mode fields of a conventional single-mode fiber (SMF) and a representative large-mode-area (LMA) erbium/ytterbium (Er:Yb)-doped gain fiber. It will be appreciated from the following discussion that the scope of the described techniques extends beyond the particular fibers and coupling mode used in the present example.

Figure 1A:
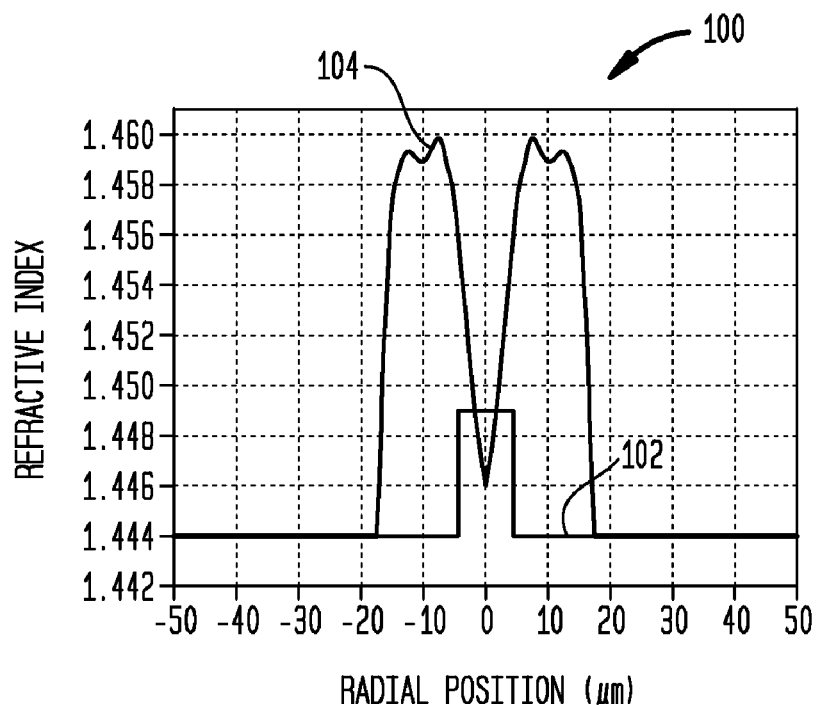
FIGS. 1A and 1B show a pair of graphs comparing the refractive index profiles and $LP_{01}$ fundamental mode field distributions for an exemplary single mode fiber (SMF) and a large mode area (LMA) erbium/ytterbium (Er:Yb)-doped gain fiber.
Figure 1B:
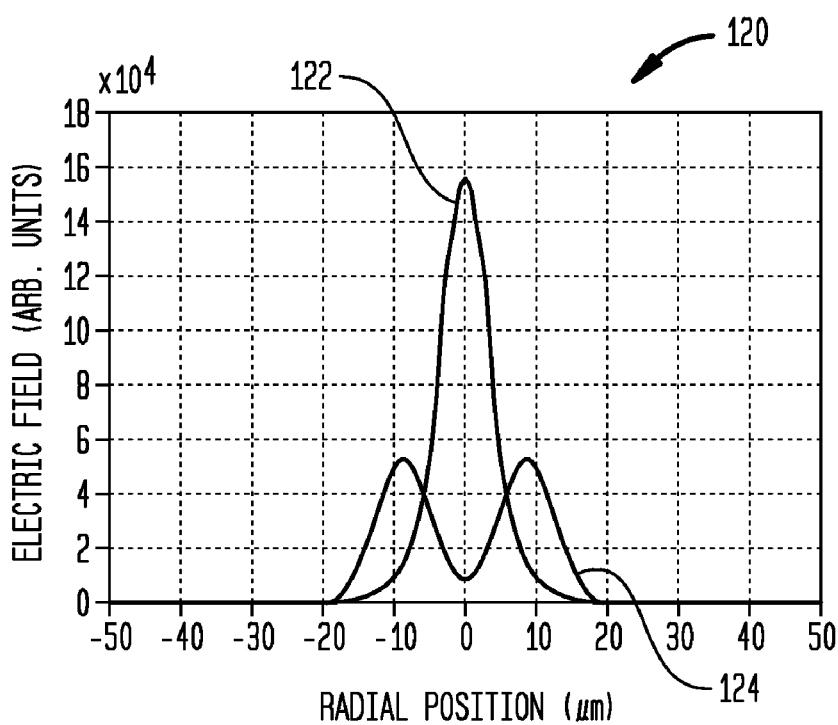

As described in further detail below, the SMF fiber $LP_{01}$ mode field distribution has a shape that is substantially Gaussian, whereas the LMA fiber $LP_{01}$ mode field has a shape that is highly non-Gaussian. The differences between the two fibers are illustrated in FIGS. 1A and 1B. FIG. 1A shows a graph 100 comparing the respective refractive index profiles for the SMF fiber 102 and for the LMA fiber 104. In graph 100, the x-axis corresponds to radial position, in micrometers, across each fiber, with the center of each fiber corresponding to the origin. The y-axis corresponds to the refractive index of each fiber as a function of radial position. The step-shaped trace 102 shows the refractive index profile for the SMF fiber, and the M-shaped trace 104 shows the refractive index profile for the LMA fiber. It will be seen in FIG. 1A that, compared with the conventional SMF, the LMA fiber index profile has (1) a very high core-clad index difference, (2) a strong center dip, and (3) a very large core diameter.

Figure 2A:
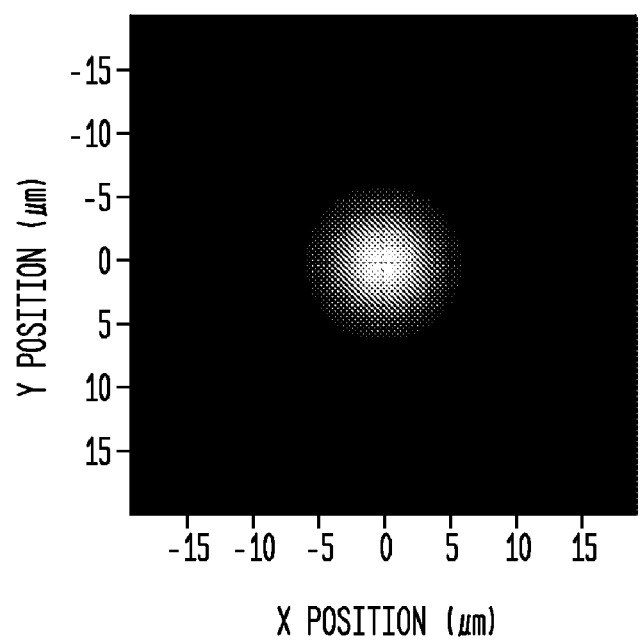
FIGS. 2A and 2B show a pair of graphs comparing the numerically predicted near field optical intensity of the fundamental $LP_{01}$ mode field for the SMF fiber and the LMA fiber at 1550 nm.
Figure 2B:
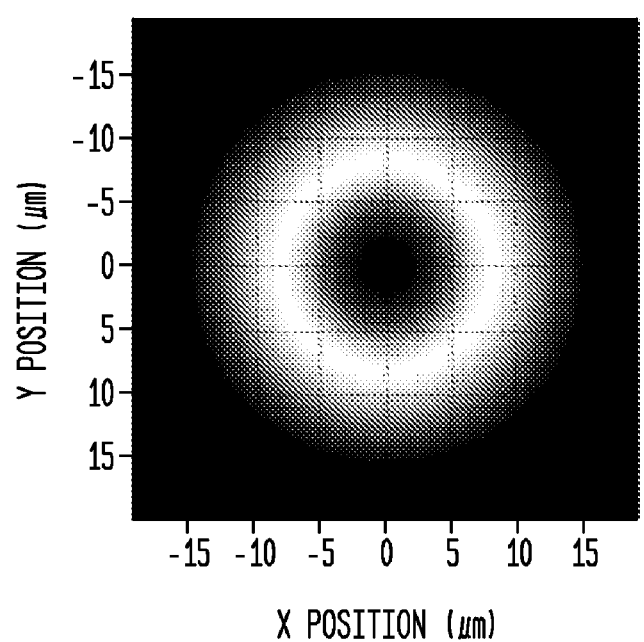

FIG. 1B shows a graph 120 comparing the respective $LP_{01}$ fundamental mode field distributions for each of the two fibers, carrying the same optical power at 1550 nm. In graph 120, the x-axis again corresponds to radial position for each of the two fibers. The y-axis corresponds to electric field, expressed in arbitrary units. The taller, single-peaked trace 122 illustrates the $LP_{01}$ fundamental mode field distribution of the SMF fiber. The shorted, double-peaked trace 124 corresponds to the $LP_{01}$ fundamental mode field distribution of the LMA fiber. FIGS. 2A and 2B are a pair of graphs 140 and 160, comparing the numerically predicted near field optical intensity of the fundamental $LP_{01}$ mode field for the SMF fiber 140 and the LMA fiber 160 at 1550 nm.

As can be seen from FIGS. 1B, 2A and 2B, the fundamental $LP_{01}$ mode fields differ in both their shape and their size. The optical loss computed via the overlap integral between these two mode fields is approximately 7.4 dB. As a result, when these two fibers are connected directly to each other using conventional methods such as butt coupling, fusion splicing, or bulk lenses, there is a significant amount of optical loss. Another problems is that when one or both of the fibers are capable of guiding higher-order modes, such as the LMA fiber in this example, some of the "lost" optical energy can be captured by a higher-order mode, thereby inducing multipath interference (MPI) or other deleterious effects.

Heat-induced dopant diffusion can be used to manipulate both the size and shape of a mode field at a fusion splice. When the fusion splice is held at high temperatures, the dopants comprising the core will approach a Gaussian concentration distribution and thereby create a Gaussian mode field shape in large mode fibers at the splice joint. However, the time required for dopant diffusion is proportional to the square of linear distance. Therefore when the core diameter is relatively large, such as the LMA fiber depicted here, the rate of diffusion at even the highest possible temperatures is too long to be practical. Moreover, dopant diffusion is not a very flexible technique.

FIG. 3 shows a simplified, exploded diagram illustrating the construction of an optical fiber transmission line 200 by interconnecting an SMF launching fiber 210 with an LMA receiving fiber 220. The direction of signal propagation is indicated by arrow 202. For convenient reference, the respective fundamental $LP_{01}$ mode field distributions 212 and 222 for the two fibers 210 and 220 are depicted over the respective fiber ends. As discussed above, the difference in the shape and size of the two mode field distributions 212 and 222 leads to a significant amount of coupling loss.

One technique that has been used to reduce coupling loss is to use a graded index (GRIN) fiber lens, also referred to as a "graduated refractive index lens," comprising a precise and short, typically less than one millimeter, length of graded-index multimode fiber with a parabolic refractive index profile to convert an output mode field having a Gaussian shape into a mode field having a different size, but still having a Gaussian shape. The limitations of this technique are illustrated in FIG. 4.

FIG. 4 illustrates a simplified, exploded diagram illustrating a modified optical transmission line 250, in which coupling loss is reduced through the use of a coupling waveguide 230 incorporating a GRIN lens having an optimized parabolic refractive index profile. The coupling waveguide 230 transforms the optical signal output of the launching fiber 210. The fundamental $LP_{01}$ mode field distribution of the transformed signal 232 is depicted over the output end of the coupling waveguide 230. As shown in FIG. 4, the transformed mode field 232 more closely matches the size of the receiving fiber's mode field distribution 222. However, as is apparent from FIG. 4, the two mode fields 232 and 222 still have significantly different shapes, resulting in a significant amount of coupling loss.

Figure 5:
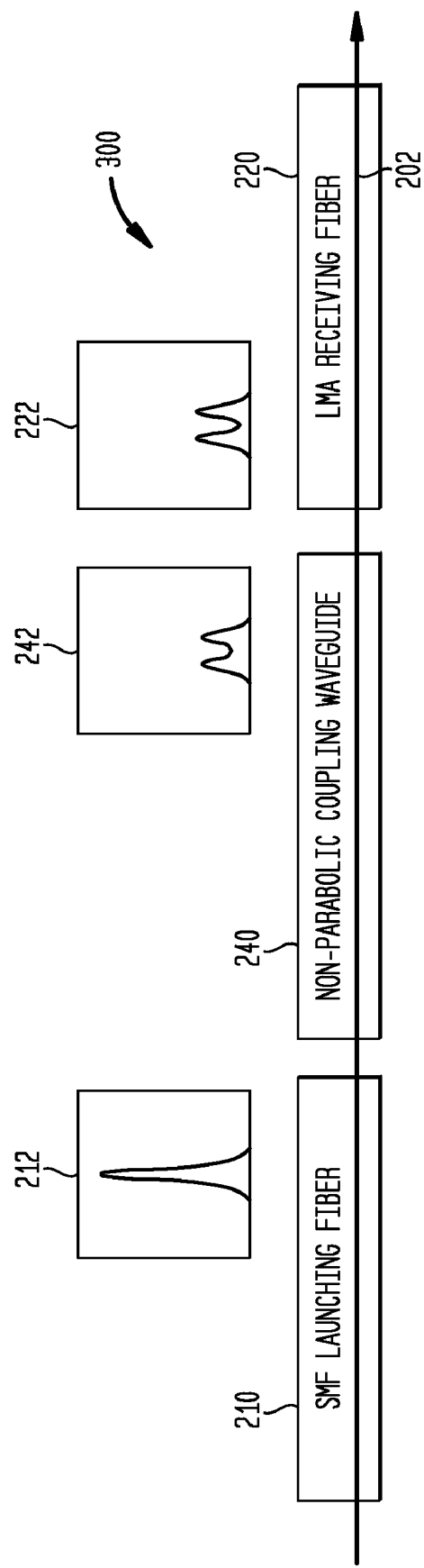
FIG. 5 shows an exploded diagram of an optical transmission line in which a coupling waveguide with a non-parabolic refractive index profile designed according to an aspect of the present invention is interconnected between the exemplary SMF and LMA fibers.

FIG. 5 shows a simplified exploded diagram of a transmission line 300 according to an aspect of the present invention, in which coupling loss is reduced through the use of a coupling waveguide 240 incorporating a GRIN lens having an optimized non-parabolic refractive index profile designed in accordance with the techniques described herein. As shown in FIG. 5, the output of the coupling waveguide 240 is a transverse mode field distribution 242 that is a significantly improved match for the receiving fiber mode field distribution 222, leading to a significant improvement in coupling loss reduction compared with the amount of coupling loss reduction that is achievable using a coupling waveguide with a parabolic refractive index profile, shown in FIG. 4.

The present invention may be illustrated through an analogy between fiber optics and conventional optics. A GRIN fiber lens provided with a parabolic index profile is analogous to a spherical lens used in conventional optics. Spherical lenses are commonly used because the geometry of their spherical surface profile is easy and economical to grind. Optical engineers have known for centuries that aspheric lenses can overcome aberrations and generally outperform spherical lenses, but are relatively difficult and expensive to fabricate. The optical path length of a spherical lens caries with the square of the distance from the optical axis, just like the optical path length of a parabolic index fiber. The present invention employs multimode GRIN fiber lens with a non-parabolic index profile. A non-parabolic GRIN fiber lens is analogous to an aspheric lens. However, unlike conventional optics, there is no manufacturing advantage for a parabolic index optical fiber over a non-parabolic index optical fiber.

A Gaussian-shaped mode field distribution is understood to be the case where the electric field distribution, E, of a mode can be described by the mathematical function:

$$E = A\exp\left(-\frac{r^2}{\omega_0^2}\right) \quad (1)$$

where A is a constant, r is the radial position in the fiber, and $\omega_0$ is the mode field radius. By definition, a guided transverse mode has a constant complex phase angle, i.e., a planar phase, across the cross section of the fiber. For this reason, when the present invention is used as a mode converter between the guided transverse modes of two optical fibers, the phase angle across the cross section of the fiber will be substantially constant at both the input end and the output end of the multimode optical coupling waveguide segment.

The extent to which a given axisymmetric mode field distribution is Gaussian can be quantified with the aid of the $M^2$ parameter, defined as:

$$M^2 = \frac{\int_0^\infty r^3 E^2 dr \int_0^\infty r\left(\frac{dE}{dr}\right)^2 dr}{\int_0^\infty rE^2 dr} \quad (2)$$

where a Gaussian shape is defined by $M^2=1.0$. As the $M^2$ parameter increases, the shape of the mode field becomes increasingly non-Gaussian. Generally speaking, the presently described techniques are particularly useful when coupling a first fiber with an $M^2$ parameter less than 1.2 to a second fiber having an $M^2$ greater than 1.2, or when coupling two fibers each having an $M^2$ parameter greater than 1.2. However, it will be appreciated that the presently described techniques may be used to reduce coupling loss for any combination of fibers, at least one of which has a non-Gaussian mode field.

Figure 6:
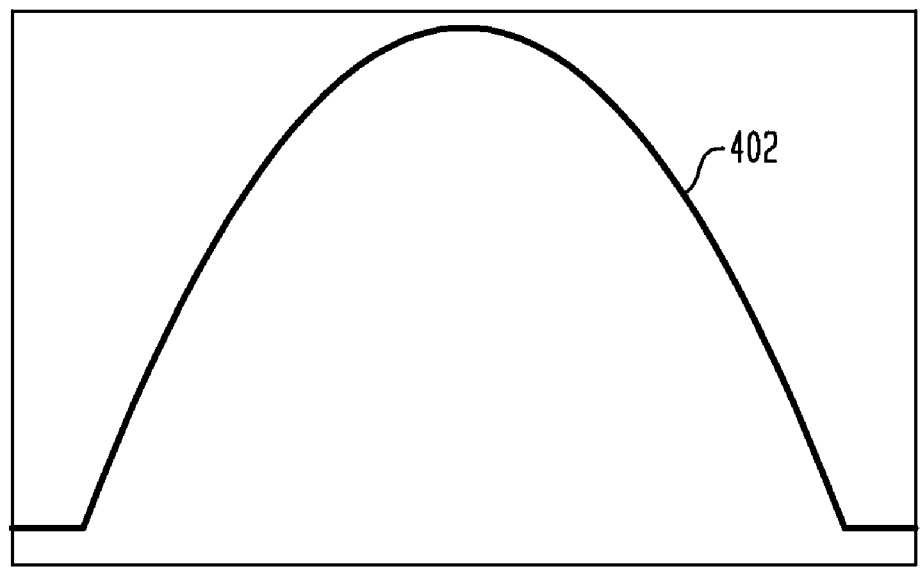
FIG. 6 shows an optimized parabolic refractive index profile for a coupling waveguide.

A technique is now described for designing a coupling waveguide for reducing coupling loss between the sample SMF and LMA fibers. First, based upon the mode field distributions shown in FIGS. 1B, 2A, and 2B, discussed above, an optimized parabolic index profile is developed through the use of a suitable technique, such as a cylindrically symmetric scalar finite distance beam propagation method (FD-BPM). FIG. 6 shows a graph 400 illustrating an optimized parabolic index profile 402.

The optimized parabolic index profile 402 is then subject to various perturbations, such as those included in Equation (3). The specific perturbations chosen may vary, depending upon the particular fibers to be interconnected. For example, in order to reduce coupling loss between the SMF and LMA fibers currently under discussion, the specific perturbations would include perturbations introducing a central dip into the parabolic index profile and altering the exponent of the radial dependence from 2 to approximately 2.5.

Suitable numerical routines, such as FD-BPM codes, can be used to predict the optical coupling of the parabolic profile in the presence of the perturbations. Trial-and-error or non-linear optimization routines can be employed to search the relevant parameter space to find a perturbed refractive index profile that yields improved performance. Improved performance may be quantified as the $LP_{01}$-to-$LP_{01}$ coupling loss, or the coupling loss between any other two modes of the launching and receiving fibers. As noted below, improved performance could be the minimization of coupling into an undesired mode of the receiving fiber.

Figure 7:
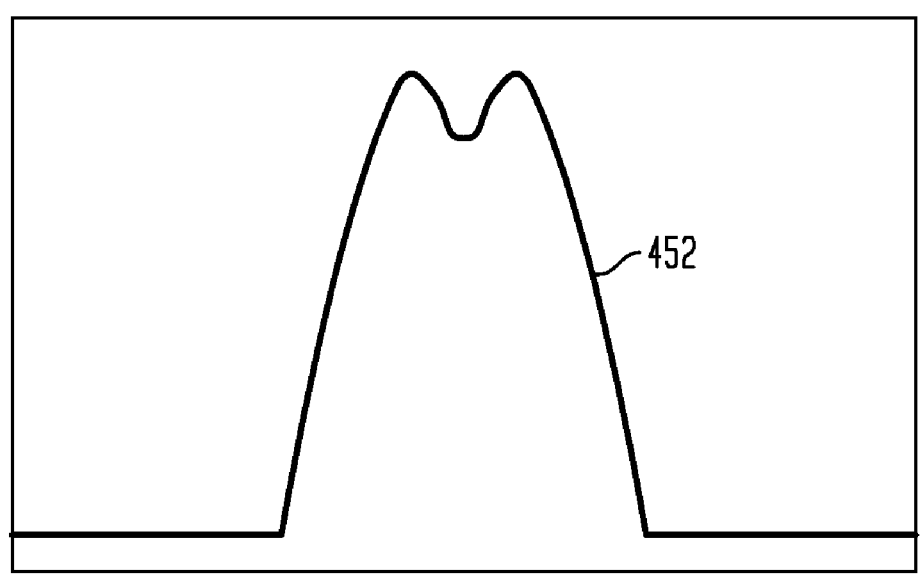
FIG. 7 shows an optimized non-parabolic refractive index profile for a coupling waveguide, according to an aspect of the present invention.

Through the application of the above-described techniques, a perturbed refractive index profile was found that includes (1) a Gaussian-shaped center dip and (2) a non-parabolic dependence of refractive index upon radius. FIG. 7 shows a graph 450 illustrating the general shape of the perturbed refractive index profile 452. The refractive index profile 452 can be expressed by the following equation:

$$n(r) = n_{clad} + \left\{1 - C\exp\left(-\left(\frac{r}{w}\right)^2\right)\right\}\left\{n_0\sqrt{1 - 2\Delta\left(\frac{r}{a}\right)^g} - n_{clad}\right\} \quad (3)$$

where n(r) is the refractive index profile as a function of radial position r, $n_0$ is the refractive index in the center of the core where r=0, $n_{clad}$ is the refractive index of the cladding, a is the radius of the core, g is a parameter controlling the steepness of the core. C is a parameter controlling the depth of the Gaussian-shaped center dip, and w is a parameter controlling the width of the Gaussian-shaped center dip. $\Delta$ is the relative index difference between the center of the core and the cladding given by:

$$\Delta = \frac{n_0^2 - n_{clad}^2}{2n_0^2} \quad (4)$$

If the exponent g is equal to 2 and if the coefficient C is equal to 0, then equations (3) and (4) describe a parabolic index profile. The optimized parabolic index profile 402 depicted in FIG. 6 has the following values:

$n_{clad}$=1.444;
$n_0$=1.4725;
$\Delta$=0.01917;
a=43 µm;
g=2;
and C=0.

If in Equation (3), C≠0 or g≠2, or both, then the resulting index profile is non-parabolic. The optimized non-parabolic index profile 452 depicted in FIG. 7 has the following values:

$n_{clad}$=1.444;
$n_0$=1.4725;
$\Delta$=0.01917;
a=20.6 µm;
g=2.46;
w=4.7 µm; and
C=0.22.

It should be noted that other techniques and equations may be used to mathematically express a non-parabolic index profile. It will therefore be appreciated that Equation (3) is presented as an example of the described technique, and that the scope of the described technique extends beyond this particular example.

Figure 8:
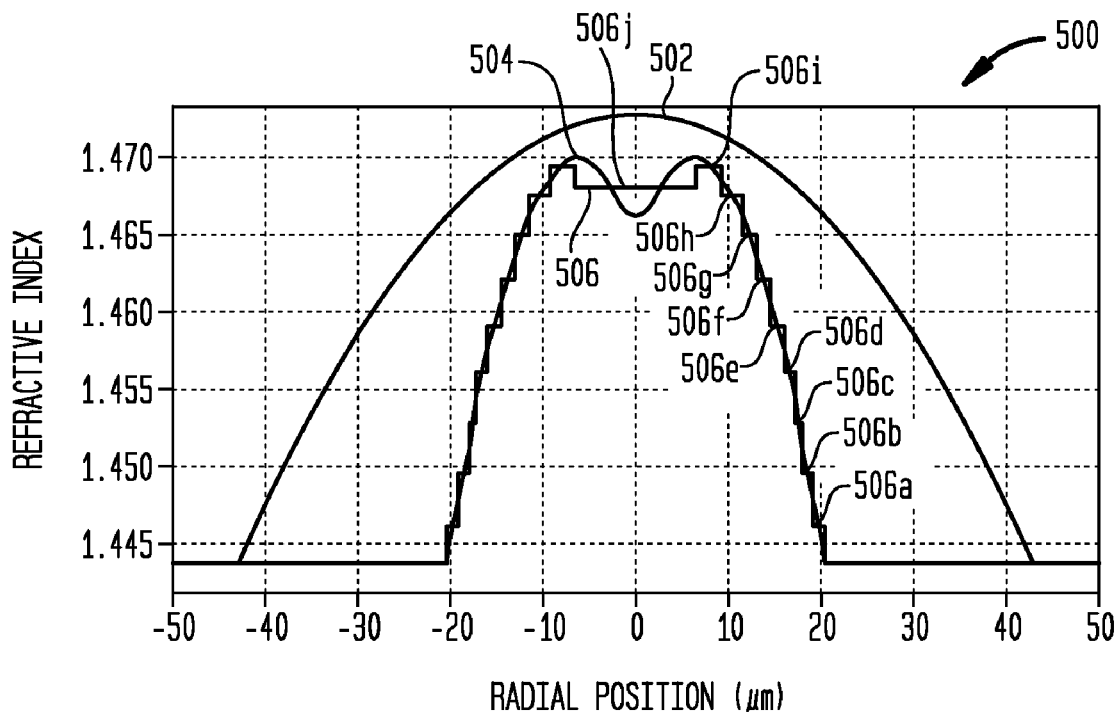
FIG. 8 shows a graph showing an optimized parabolic refractive index for a coupling waveguide, an optimized non-parabolic refractive index for a coupling waveguide, and a step-wise approximation of the non-parabolic refractive index.

FIG. 8 shows a graph 500 comparing three different coupling waveguide refractive index profiles for coupling energy from the $LP_{01}$ mode of the SMF, functioning as a launching fiber, into the fundamental $LP_{01}$ mode of the LMA fiber, functioning as a receiving fiber. Trace 502 shows the optimized parabolic refractive index profile, discussed above. Trace 504 shows the optimized non-parabolic refractive index profile, also discussed above. Trace 506 shows a step-wise approximation of trace 504, in which trace 504 has been broken down into ten symmetrical steps 506a-j.

Figure 9:
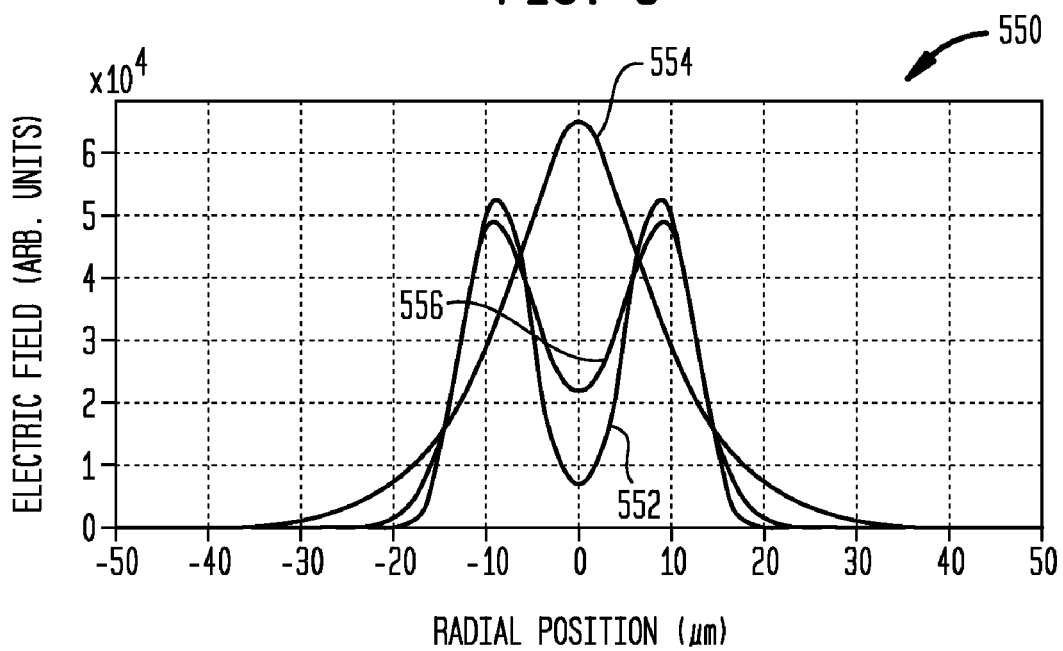
FIG. 9 shows a graph comparing the $LP_{01}$ mode field distribution of the LMA fiber, the signal output of a coupling waveguide having an optimized parabolic refractive index, and the signal output of a coupling waveguide having an optimized non-parabolic refractive index.

FIG. 9 is a graph 550 comparing the fundamental $LP_{01}$ mode field of the LMA fiber 552 to the transverse mode field distribution of the output of the parabolic-index-profile coupling waveguide 552 as well as the transverse mode field distribution of the output of the non-parabolic-index-profile coupling waveguide 556. The improved agreement between the mode field distributions of the LMA fiber 552 and the non-parabolic-index-profile coupling waveguide 556 is clear.

The predicted coupling loss for the refractive index profiles were computed with the aid of a cylindrically symmetric scalar finite-difference beam-propagating-method (FD-BPM). The parabolic index profile 502 in FIG. 8 has a predicted coupling loss of approximately 1.25 dB when the segment of optimized parabolic index profile fiber is approximately 346 micrometers long. In contrast, the continuous non-parabolic index profile 504 has a predicted coupling loss of approximately 0.1 dB when the multimode coupling waveguide segment is approximately 205 micrometers long. It should be noted that the coupling loss between an individual mode of a launching fiber and an individual mode of a receiving fiber is the same in both propagating directions; in other words, the coupling loss is reciprocal. Therefore the present invention is optically reciprocal and effective for optical coupling in either propagating direction.

The efficacy of the present invention depends on optical interference between several guided transverse modes inside the substantially non-parabolic multimode coupling waveguide segment. When the input electric field enters the multimode coupling waveguide segment it is decomposed into several guided transverse modes, each of which travels through the multimode coupling waveguide segment with a distinct axial propagation constant, in other words, at a distinct phase velocity. Typically, only a few of the transverse modes guided by the multimode coupling waveguide segment are substantially excited by the input field. The amount of optical power contained within each of the distinct guided transverse modes remains substantially constant as they independently travel through the multimode coupling waveguide segment. However, since each mode is traveling at a different phase velocity, when they are recombined at the output of the multimode coupling waveguide segment, a relative phase difference will usually accumulate between the various modes. The relative phase difference accumulated between the various modes causes the optical field at the output of the multimode coupling waveguide segment to differ substantially from the optical field at its input. The modes can recombine with almost no accumulated relative phase differences at certain special distances determined by the phase velocities of the excited transverse modes. In these special cases, the original input field is substantially reproduced at the output.

In some embodiments of the present invention, the number of substantially excited modes in the multimode waveguide is relatively small, i.e., less than 10, and therefore there will be one or more distances at which all the excited modes accumulate very nearly 0 or $\pi$ radians of relative phase. At these distances, the input and output mode fields will both have planar phase and will therefore be suitable for coupling to a planar phase output electric field, which could be, for example, a specific mode of a receiving optical fiber. When the accumulated relative phase of at least some of the substantially excited modes in the present invention is substantially close to $\pi$ instead of 0 radians, the output electric field can exhibit a substantially different size and shape from the input electric field.

In prior art parabolic index GRIN fiber lenses all the phase velocities are equally spaced and, as a result, the distances that yield planar phase can be defined as so-called "full-pitch", "half-pitch", and "quarter-pitch" distances. At the "full-pitch" distance the accumulated relative phase between all modes is a multiple of $2\pi$ and the output electric field has the same polarity as the input signal. At the "half-pitch" distance the relative phase difference amongst all the modes is also a multiple of $2\pi$, but the electric field has the opposite polarity of the input signal. At the "quarter-pitch" distance every odd numbered mode ($LP_{01}$, $LP_{03}$, $LP_{05}$, etc.) has very nearly 0 radians of accumulated relative phase while every even numbered mode ($LP_{02}$, $LP_{04}$, $LP_{06}$, etc.) has very nearly $\pi$ radians of accumulated relative phase. This fact enables prior art GRIN fiber lenses to produce a large variation between the size of a Gaussian input signal and the Gaussian output signal but does not permit a variation in the shape between the input and output electric fields. In some embodiments of the present invention, the phase velocities of the excited modes also differ from each other by whole multiples, in which case there will be special distances at which a "quarter-pitch" difference can be defined as the distance at which neighboring modes have very nearly $\pi$ radians of accumulated relative phase difference. However, in this case, the present invention can produce a large variation between both the size and the shape of the input and output electric fields.

It should be noted that it is possible for the alignments of the respective cores of the launching fiber, coupling waveguide, and receiving fiber to be slightly perturbed, such as by an angled cleave or core concentricity. In that case, a small amount of light may be coupled into unwanted modes. Such random couplings do not substantially affect the above-described principles of operation of the present invention.

When using the present invention to directly couple the optical signal between specific modes of two dissimilar optical fibers, the amount of power coupled from the launching fiber's mode into any transverse mode of the non-parabolic multimode coupling waveguide segment should be approximately equal to the amount of power coupled between that transverse mode of the non-parabolic multimode coupling waveguide and the desired mode of the receiving fiber. This coupling can be numerically evaluated by applying the overlap integral to the mode fields with suitable normalization. When the optical coupling is between the input and output fields is made more symmetric (for example by tweaking the index profile of the multimode coupling waveguide segment) the invention will provide more efficient coupling.

Therefore when seeking to directly couple two dissimilar fiber mode fields using the present invention, the goal is to design a non-parabolic coupling waveguide segment exhibiting two important characteristics: (1) the optical coupling between the input field and a given mode in the segment must be approximately equal to the optical coupling between the desired output field and that mode in the segment, and (2) the length of the segment should be chosen to be near a length at which the accumulated relative phase of at least some of the excited modes in the coupling waveguide is substantially $\pi$ radians while the accumulated relative phase of the other excited modes in the coupling waveguide is substantially 0 radians.

Figure 10:
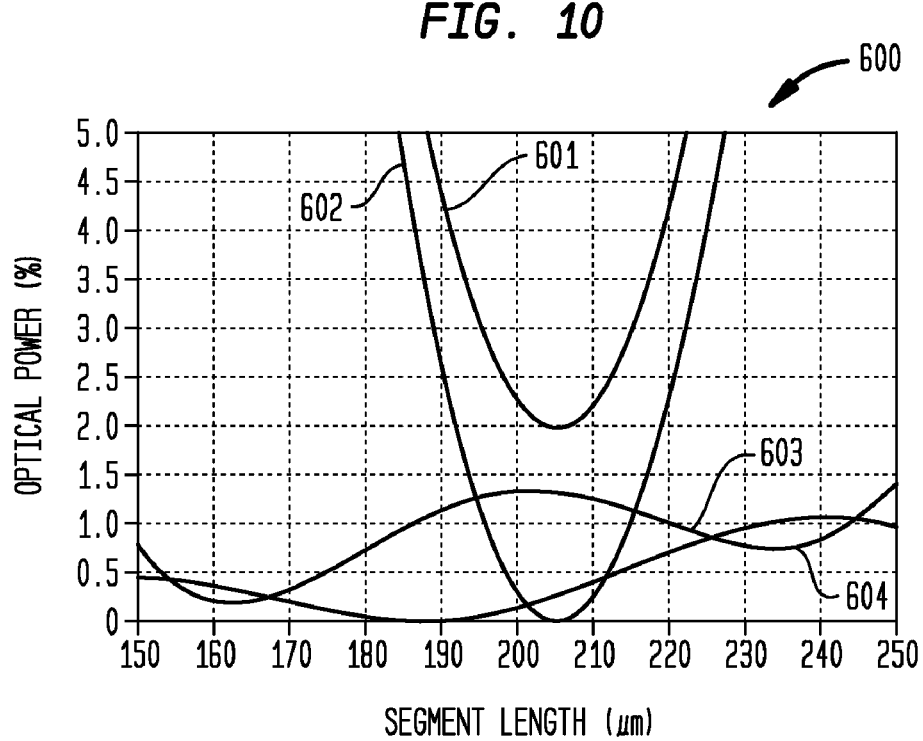
FIG. 10 shows a graph illustrating the length-dependence of coupling loss for various coupling modes.

FIG. 10 is a graph 600 illustrating how the amount of optical energy coupled between various modes of the receiving fiber depends on the length of the non-parabolic-index-profile coupling waveguide. Traces 601-604 show, respectively, the length dependence of the $LP_{01}$, $LP_{02}$, and $LP_{03}$, and $LP_{04}$ modes in the receiving fiber. Trace 601 shows the percent of the signal power lost from the $LP_{01}$ mode of the receiving fiber as a function of coupling waveguide length while traces 602-604 show the percent of signal power gained by several undesirable high-order core modes in the receiving fiber. Graph 600 illustrates how the segment length of a particular coupling waveguide design can affect the amount of energy lost from the $LP_{01}$ modes as well as how much energy is coupled into high order core modes, which may be undesirable.

In particular, as shown in graph 600, at a particular segment length of 205 micrometers, the amount of energy lost from the $LP_{01}$ modes 601 is minimized. However, the amount of the energy coupled in the higher-order core modes of the receiving LMA fiber may not be minimized at this segment length. For example, the amount of optical energy coupled into the $LP_{03}$ mode 603 of the receiving LMA fiber is minimized at approximately 163 micrometers and is near a local maximum at 205 micrometers. If the most important design goal is to minimize coupling into the $LP_{03}$ mode 603, then the segment length may be chosen to be near 163 micrometers, even though such a segment length results in increased $LP_{01}$ mode loss 601.

Once a suitable refractive index profile has been designed for the coupling waveguide, the fiber can be fabricated according to standard optical fiber fabrication techniques known in the prior art such as a modified chemical vapor deposition (MCVD) process. In this process, a chemical reaction deposits vaporized chemical soot in a layer-by-layer fashion on the inside surface of an outer tube, fabricated from silica ($SiO_2$) or other suitable material. Each soot layer is consolidated prior to the deposition of the next layer.

Once the chemical deposition process has been completed, the substrate tube is heated to a high enough temperature to cause it to collapse and to cause the deposited soot layers to sinter to form a solid, cylindrical preform. If necessary, hydrofluoric acid, plasma etching, or other suitable technique may be used to adjust the preform outer diameter. In addition, the preform may be provided with a silica tube as an overclad to modify the preform's outer diameter. The finished preform is then drawn into optical fiber.

The deposited soot layers become concentric cylindrical regions in the finished fiber. It is possible to precisely control the refractive index profile for each cylindrical region in the finished fiber by adding one or more index-altering dopants to each deposited soot layer. Typical dopants include germanium, aluminum, fluorine, and phosphorus. The described techniques allow the refractive index and radial dimensions of individual layers to be controlled with great precision.

Figure 11:
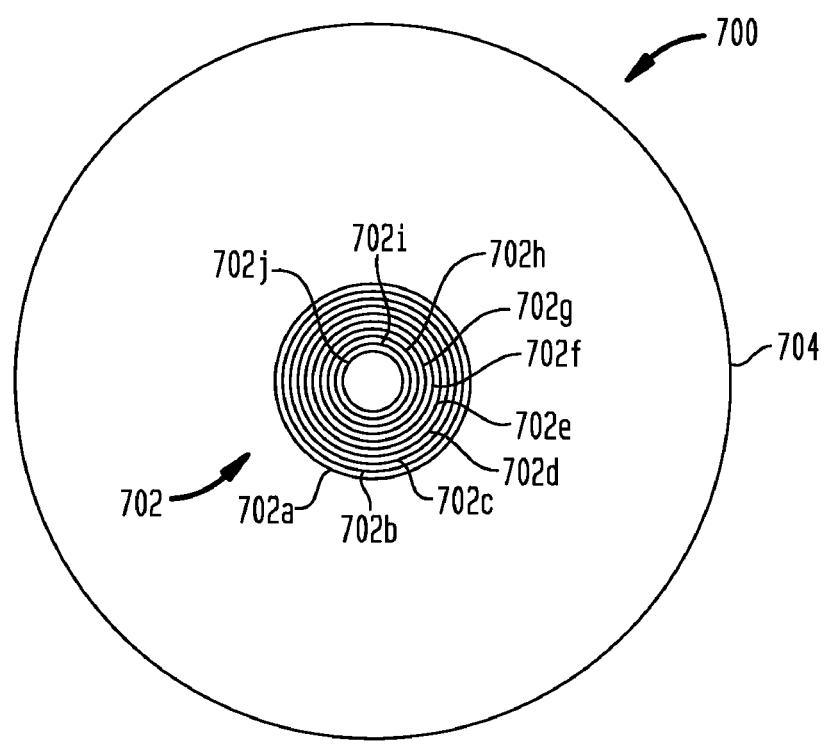
FIG. 11 shows a cross section, not drawn to scale, of a multimode coupling waveguide according to a further aspect of the present invention.

An MCVD technique may be used to manufacture a coupling waveguide having a non-parabolic refractive index profile. As shown by trace 506 in FIG. 8, the refractive index profile can be approximated using a series of steps 506a-j. Each step corresponds to a layer of deposited soot. The number of steps, and the particular dimensions of each step, can be optimized using the modeling techniques described above. In addition, manufacturing costs may be taken into consideration in determining the number of layers to be used. The number of layers is expected to range between 7 and 50, although depending upon the particular circumstances, the number of layers may fall outside of this range. In practice, the deposited layers may exhibit ripple or other non-uniformities that may affect the performance of the coupling waveguide. These non-uniformities can be compensated for by adjusting the radial refractive design of the coupling waveguide. Typically, several glass preforms may need to be fabricated and the design may need to be refined through a number of iterations of the design of the preform or fiber. FIG. 11 shows a cross section, not drawn to scale, of the finished fiber 700. The fiber 700 includes a core 702 and an outer cladding 704. The core includes ten concentrically layered regions 704a-j, each layer corresponding to one of the steps in the step-wise refractive index profile 506 shown in FIG. 8.

Numerical simulations show that the step-wise design is tolerant to small manufacturing variations. Further, even in the presence of such variations the predicted coupling loss is much lower than the coupling loss typically achievable using a parabolic refractive index profile. Methods for assembling a precise, sub-millimeter segment of fiber between two other fibers based on fusion splicing followed by precision cleaving are known in the art.

According to a further aspect of the invention, the performance of the coupling device is tuned by manipulating the index profile of the non-parabolic multimode coupling waveguide segment. Techniques such as UV-irradiation, thermally-induced dopant diffusion, or physical stretching or compressing of the coupling waveguide segment at high temperature can be used to manipulate the refractive index profile of the assembled coupling waveguide segment. In this way the performance of the fiber drawn from the preform or an assembled coupling arrangement can be tuned and improved. As used herein, tuning may include any or all of the following, either singly or in combination: (1) reducing the optical loss between the launching and receiving modes of the dissimilar optical fibers; (2) reducing the optical loss when coupling to an optical fiber termination; (3) improving the $M^2$ and hence the beam quality emitted from an optical fiber termination; or (4) other suitable techniques.

Figure 12:
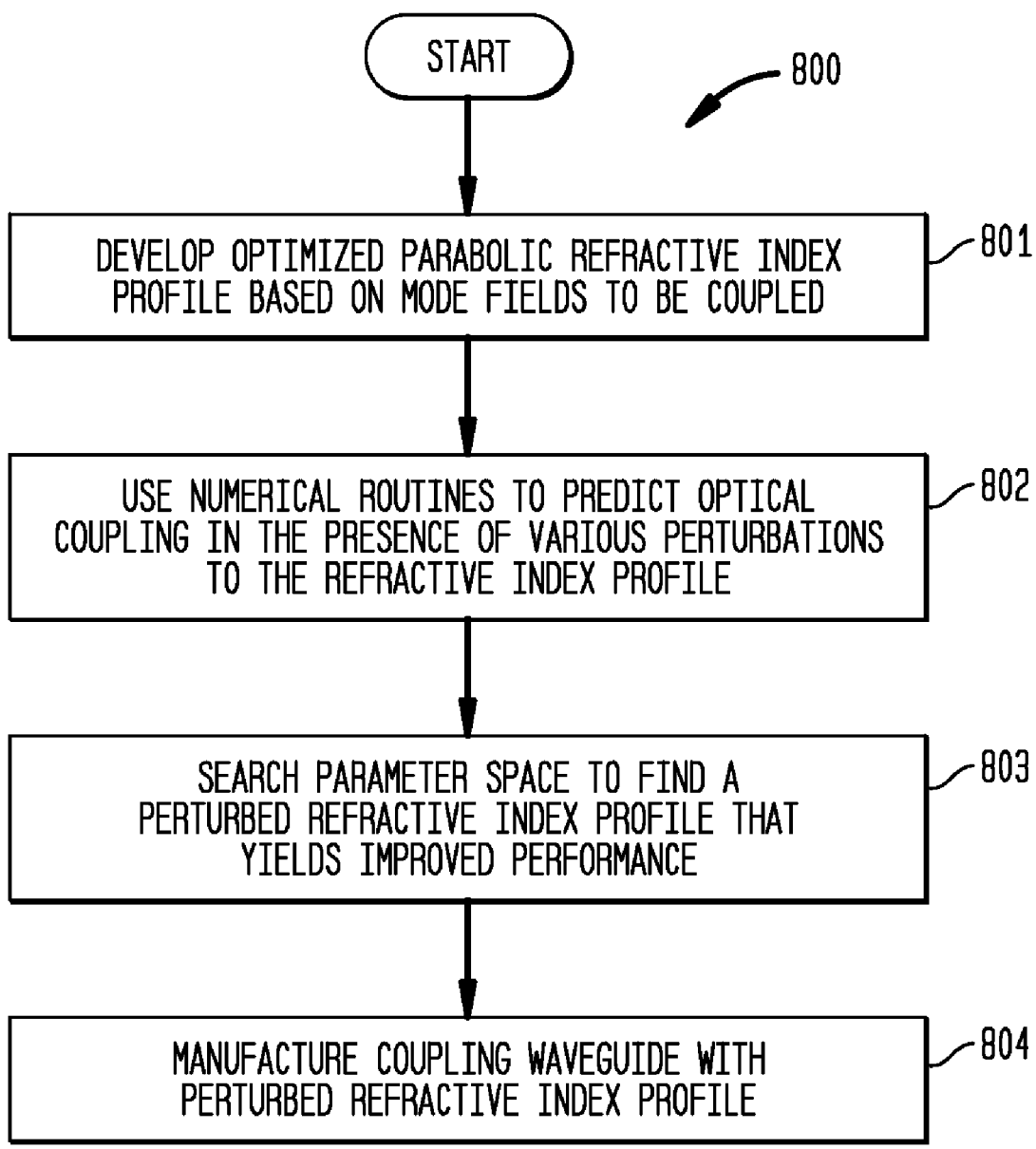
FIG. 12 shows a flowchart illustrating a method for designing a coupling waveguide according to a further aspect of the present invention.

FIG. 12 shows a flowchart of a general method 800, in accordance with the above described techniques, for designing and manufacturing a coupling waveguide with a non-parabolic refractive index profile for reducing coupling loss between dissimilar fibers. In step 801, an optimized parabolic refractive index profile is developed based on the mode fields to be coupled. In step 802, numerical routines are used to predict optical coupling in the presence of various perturbations to the optimized parabolic refractive index profile. In step 803, the parameter space is searched to find a perturbed refractive index profile that yields improved performance. Finally, in step 804, a coupling waveguide is manufactured having the desired refractive index profile. As discussed above, step 804 will typically include iterative adjustments and refinements to the radial refractive design.

Figure 13:
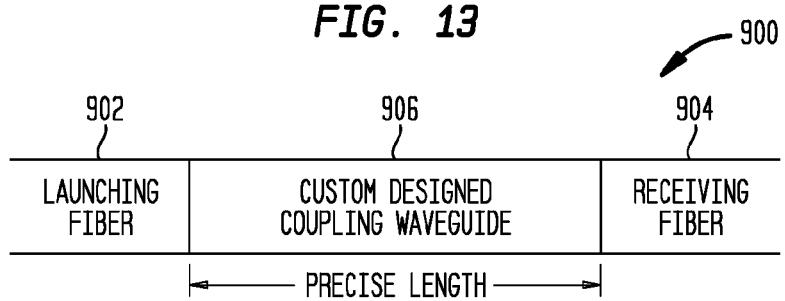
FIGS. 13-15 are a series of drawings illustrating alternative configurations for an optical fiber transmission line incorporating a coupling waveguide according to the present invention.
Figure 14:
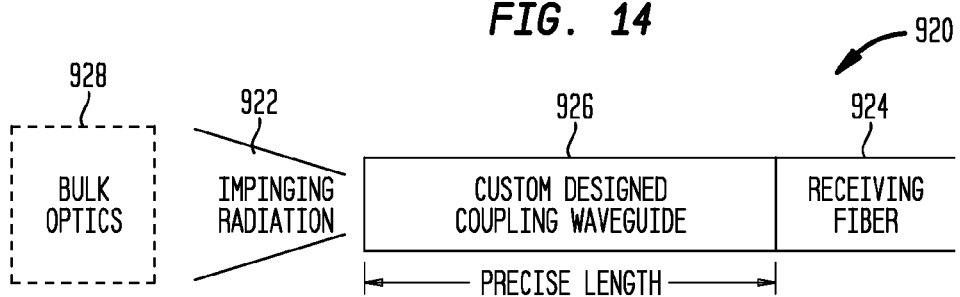
Figure 15:
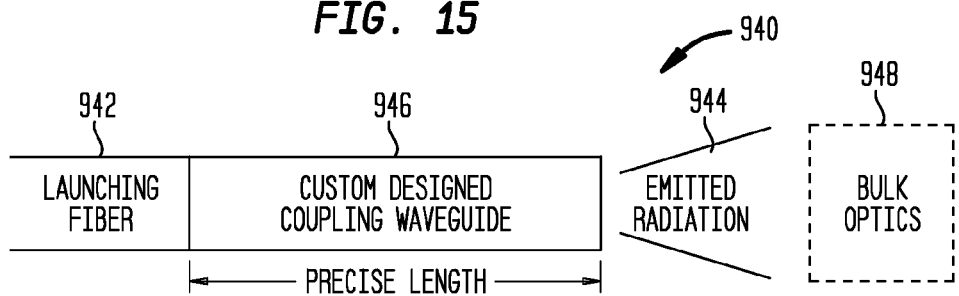

FIGS. 13-15 show a series of diagrams illustrating alternative configurations of an optical transmission system including a multimode coupling waveguide with a non-parabolic refractive index profile. It will be appreciated FIGS. 13-15 are intended to be exemplary, and not exhaustive, of configurations in accordance with aspects of the invention.

FIG. 13 shows an optical transmission line 900 according to an aspect of the invention. The transmission line includes a launching fiber 902 and a receiving fiber 904 having different mode field distributions, at least one of which is non-Gaussian. A multimode fiber 906, which is custom-designed as described herein, is used to interconnect the launching fiber 902 and the coupling waveguide 906. The coupling waveguide 906 has a first end, referred to herein as an "input end" that is connected to the launching fiber 902, and a second end, referred to herein as an "output end" that is connected to the receiving fiber 904. As discussed above, the coupling waveguide has a precise length.

The multimode coupling waveguide 906 may be attached to the other fibers 902 and 904 by mechanical butt coupling, fusion splicing, or other suitable technique. The special design of the multimode fiber 906 ensures that it will convert both the size and shape of an optical signal exiting the launching fiber 902 to substantially match that of the receiving fiber 904, thereby resulting in a substantial reduction of coupling loss. It is understood that either of the launching fiber 902 or the receiving fiber 904 may be single mode or multimode. Further, although the present aspects of the invention are described with respect to the fundamental $LP_{01}$ mode of the launching fiber 902 and the receiving fiber 904, the described technique may be applied to couple any specific mode of a launching fiber into any specific mode of a receiving fiber.

As depicted in FIGS. 14 and 15, a custom-designed coupling waveguide according to the present invention can be used at the terminus of an optical fiber. For example, in FIG. 14, the output end of the coupling waveguide 926 is connected to the terminus of a receiving fiber 924. No launching fiber is connected to the input end of the coupling waveguide 926. Rather, the input end of the coupling waveguide remains exposed, and receives an optical input in the form of impinging radiation 922. Thus, using this configuration, a precise length of customized non-parabolic multimode fiber may be used to transform the size or shape of an intensity pattern launched into a fiber from an external source, such as a bulk optic source 928, or the like.

In FIG. 15, the input end of the coupling waveguide 946 is connected to a launching fiber 942. No receiving fiber is connected to the output end of the coupling waveguide 946. Rather, the output end of the coupling waveguide remains exposed, and provides an optical output in the form of emitted radiation that may be used, for example, to provide a signal to a bulk optic receptor 948. Thus, using this configuration, a precise length of customized multimode fiber may be employed to manipulate the size and/or shape of the intensity profile emitted from the terminus of a fiber. In this way, the spatial profile of the emission of an optical fiber source such as an optical fiber laser or amplifier can be made more Gaussian.

It should be noted that the above-described systems and techniques may be used to provide coupling from a higher mode at the coupling waveguide input to a substantially Gaussian-shaped transverse spatial distribution at the coupling waveguide output. The substantially Gaussian-shaped transverse spatial distribution may, but does not necessarily, correspond to a fundamental mode. Such a configuration could be used, for example, at the amplifier exit for a higher-mode amplifier, which may have an extremely large mode area. Converting the output of a higher-mode amplifier to a substantially Gaussian transverse spatial distribution is desirable so that conventional optics can be used for collimating and transmitting the resulting beam. This conversion may be done in free space using a phase plate, but it may be necessary to place an end cap at the fiber terminus to reduce the high intensity of the central lobe. Using a resonant long-period grating mode converter would be restricted to coupling into a relatively small mode area fundamental mode. A non-parabolic coupling waveguide, as described herein, could be used to couple the higher-order mode into a large substantially Gaussian-shaped transverse spatial distribution. The output segment would be different from the higher-order mode fiber. The coupling waveguide could terminate in an output fiber with a large core, in a coreless fiber segment, or into free space.

It is understood that the present invention may be used in conjunction with conventional optical fibers, microstructured optical fibers, polarization-maintaining (PM) optical fibers, single-mode optical fibers, multimode optical fibers, rare-earth doped gain-producing optical fibers such as those used in optical fibers and amplifiers, and cladding pumped optical fibers, such as double-clad fibers, or the like.

Further, although the present invention is primarily intended to couple the energy between the non-Gaussian shapes of the $LP_{01}$ mode fields of large mode area optical fibers, the present invention may also be applicable in other cases when coupling a non-Gaussian optical field. For example, the present invention can also be used to couple energy into or out of a higher-order optical fiber mode ($LP_{02}$, $LP_{03}$, etc.), which generally exhibits a substantially non-Gaussian shape. As another example, the present invention can be manifested in the form of an optical rod, rather than a fiber, exhibiting a significantly non-parabolic index profile. Such a non-parabolic index profile rod lens could be useful in an assembly of bulk lenses or mirrors, or other like non-fiber devices.

The techniques described herein may be applied to reduce coupling loss between any two differently shaped mode field distributions, at least one of which is non-Gaussian. By mathematically modeling the desired input and output mode field distributions of the coupling waveguide, it is possible to generate a mathematical model of a non-parabolic refractive index profile for the coupling waveguide that reduces coupling loss. The modeled coupling waveguide may then be constructed using an MCVD technique, or other suitable technique, as described herein. Empirical techniques may be used to adjust the refractive index profile of the coupling waveguide in order to optimize performance.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. An optical fiber coupling system, comprising:
  a pair of transmission fibers including a launching fiber for launching an optical signal and a receiving fiber for receiving the optical signal, the launching fiber and the receiving fiber having different transverse mode field distributions, at least one of which is non-Gaussian, and
  a prescribed length of a multimode coupling waveguide having an input end connected to the launching fiber and an output end connected to the receiving fiber,
  the coupling waveguide including an integrity formed graded index lens having a non-parabolic refractive index profile, the graded index lens receiving as an input a coupling mode field of an optical signal launched by the launching fiber and transforming the coupling mode field into a transverse spatial distribution matching a corresponding coupling mode field of the receiving fiber.

2. The coupling system of claim 1, wherein the refractive index profile of the coupling waveguide varies transversely, but not axially.

3. The coupling system of claim 2, wherein the coupling waveguide guides a series of transverse modes formed from excitation by the launching fiber at the input end of the coupling waveguide, such that the optical field emitted at the output end of the coupling waveguide exhibits an optical phase that is substantially constant across the waveguide cross section whereas the transverse distribution of optical energy at the output end is substantially different from that at the input end of the coupling waveguide, whereby the relative phase accumulated by at least one of the transverse modes over the axial length of the coupling waveguide is approximately π radians and whereby the relative phase accumulated by other transverse modes over the axial length of the coupling waveguide is approximately 0 radians.

4. The coupling system of claim 3, in which any two modes in the series of guided transverse modes are separated by whole multiples of a number Δ that is characteristic of the transverse refractive index profile of the coupling waveguide,
such that the difference between the axial propagation constant of any two guided transverse modes Δn in the coupling waveguide is expressible as Δn=N*Δ, where N is an integer and Δ is a number that is characteristic of the coupling waveguide design.

5. The coupling system of claim 4, wherein the coupling waveguide has a length that is chosen to be approximately a quarter pitch, such that there is accumulated over the length of the coupling waveguide a relative phase of approximately π radians between coupling waveguide modes with neighboring axial propagation constants.

6. The coupling system of claim 5, wherein the graded index lens transforms the fundamental mode $LP_{01}$ of the optical signal such that it has a transverse spatial distribution that substantially matches the fundamental mode $LP_{01}$ field distribution of the receiving fiber.

7. The coupling system of claim 1, wherein at least one of the connections between the input and output ends of the coupling waveguide and the pair of transmission fibers is a fusion splice.

8. The coupling system of claim 1, wherein at least one of the pair of transmission fibers has a mode field with an $M^2$ parameter greater than 1.2.

9. The coupling system of claim 1, wherein the coupling waveguide has a refractive index profile described by $$n(r) = n_{clad} + \left\{1 - C\exp\left(-\left(\frac{r}{w}\right)^2\right)\right\}\left\{n_0\sqrt{1 - 2\Delta\left(\frac{r}{a}\right)^g} - n_{clad}\right\}$$

where C≠0 or g≠2, or both.

10. An optical fiber coupling system, comprising:
a segment of multimode fiber having an input end and an output end, the segment of multimode fiber including an integrally formed graded index lens with a non-parabolic refractive index profile,
the graded index lens transforming a coupling mode of an optical signal traveling from the input end to the output end of the coupling fiber segment, such that its transverse spatial distribution at the output end of the coupling fiber substantially matches a designated receiving coupling mode, at least one of the coupling modes being non-Gaussian.

11. The coupling system of claim 10, wherein the output end of the coupling fiber segment is attached to a terminus of a receiving fiber, the segment reducing coupling loss between an optical signal received at the input end of the coupling fiber segment and a mode field distribution at the terminus of the receiving optical transmission fiber.

12. The coupling system of claim 10, wherein the input end of the coupling fiber segment is attached to a terminus of a launching fiber, the segment reducing coupling loss between an optical signal received at the input end of the coupling fiber segment from the terminus of the launching fiber and a transverse spatial distribution at the output end of the coupling fiber segment.

13. The coupling system of claim 12, configured such that the coupling fiber segment provides coupling from a higher-order mode at its input to a substantially Gaussian transverse distribution at its output.

14. The coupling system of claim 10, wherein at least one end of the multimode coupling fiber segment has an optical energy phase angle that is substantially constant across its cross section.

15. The coupling system of claim 10, wherein the multimode optical coupling fiber segment has a refractive index profile described by $$n(r) = n_{clad} + \left\{1 - C\exp\left(-\left(\frac{r}{w}\right)^2\right)\right\}\left\{n_0\sqrt{1 - 2\Delta\left(\frac{r}{a}\right)^g} - n_{clad}\right\}$$

where C≠0 or g≠2, or both.

16. The coupling system of claim 12, wherein the segment of multimode optical fiber is configured to couple energy between a coupling mode of the launching fiber and an arrangement of bulk optics.

17. The coupling system of claim 16, wherein the launching fiber coupling mode has an $M^2$ parameter greater than 1.2 and wherein the arrangement of bulk optics has an $M^2$ less than 1.2.

18. The coupling system of claim 1, wherein the optical signal traveling in at least one of the launching fiber and the receiving fiber occupies a transverse mode of a higher order than the $LP_{01}$ fundamental mode.

19. A method for constructing an optical transmission line, comprising:
providing a prescribed length of a multimode coupling waveguide having an input end and an output end, the segment of multimode fiber including an integrally formed graded index lens with a non-parabolic refractive index profile, the graded index lens transforming a coupling mode of an optical signal traveling from the input end to the output end of the coupling waveguide segment, such that its transverse spatial distribution at the output end of the coupling waveguide substantially matches a designated receiving coupling mode, at least one of the coupling modes being non-Gaussian, and
connecting an end of the coupling waveguide segment to a terminus of an optical transmission fiber, the coupling waveguide segment providing coupling between a first mode field distribution at the first segment end and a second mode field distribution at the second segment end, at least one of the two mode field distributions being non-Gaussian.

20. The method of claim 19, further comprising:
connecting the other end of the coupling waveguide segment to a terminus of a second optical transmission fiber, the optical transmission fibers having different mode field distributions, at least one of which is non-Gaussian, the coupling waveguide providing low-loss coupling between the two fibers.

* * * * *